(12) United States Patent
Izzo et al.

(10) Patent No.: US 10,520,928 B2
(45) Date of Patent: Dec. 31, 2019

(54) SAFETY INDUSTRIAL CONTROLLER PROVIDING DIVERSITY IN SINGLE MULTICORE PROCESSOR

(71) Applicant: Rockwell Automation Technologies, Inc., Mayfield Heights, OH (US)

(72) Inventors: Joseph P. Izzo, New Berlin, WI (US); Michael J. Viste, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 131 days.

(21) Appl. No.: 15/595,071

(22) Filed: May 15, 2017

(65) Prior Publication Data
US 2018/0329397 A1    Nov. 15, 2018

(51) Int. Cl.
G05B 19/418    (2006.01)

(52) U.S. Cl.
CPC ............ *G05B 19/4184* (2013.01); *G05B 2219/31418* (2013.01); *G05B 2219/34465* (2013.01)

(58) Field of Classification Search
CPC ...... G05B 19/4184; G05B 2219/31418; G05B 2219/34465
See application file for complete search history.

(56) References Cited

U.S. PATENT DOCUMENTS

| | | | | |
|---|---|---|---|---|
| 6,201,997 | B1* | 3/2001 | Giers | B60T 8/885 700/111 |
| 2005/0080492 | A1* | 4/2005 | Shimamura | G05B 9/03 700/30 |
| 2006/0161918 | A1* | 7/2006 | Giers | G06F 11/1641 718/102 |
| 2012/0023389 | A1* | 1/2012 | Brewerton | G06F 11/1641 714/820 |
| 2013/0232383 | A1* | 9/2013 | Yamada | G06F 11/004 714/48 |
| 2015/0177706 | A1* | 6/2015 | Kanner | G06F 11/2005 700/79 |
| 2016/0117210 | A1* | 4/2016 | Reichenbach | G06F 11/0712 714/37 |

OTHER PUBLICATIONS

Siemens; "S7-F Concept, Double processing in diverse environments"; A.O.Sveen, NTNU 2011; pp. 1-2; US.

* cited by examiner

*Primary Examiner* — Kenneth M Lo
*Assistant Examiner* — David J Wynne
(74) *Attorney, Agent, or Firm* — Boyle Fredrickson, SC (57) ABSTRACT

Different cores of a multicore processor are used to provide diagnostics of sophisticated hardware without full redundancy by static assignment of the cores during individual cycles of the control program and comparison of the outputs. A method of automatically generating diverse programs for execution by these cores may modify one program to compile two different instructions without functionally changing that program through the use of DeMorgan equivalents and diverse compiler optimizations.

18 Claims, 4 Drawing Sheets

SAFETY INDUSTRIAL CONTROLLER PROVIDING DIVERSITY IN SINGLE MULTICORE PROCESSOR

STATEMENT REGARDING FEDERALLY SPONSORED RESEARCH OR DEVELOPMENT

CROSS REFERENCE TO RELATED APPLICATION

Background of the Invention

The present invention relates to industrial controllers used for real time control of industrial processes, and in particular to an industrial controller architecture for implementing safety integrity levels (SIL) of 2 or more.

Industrial controllers are special-purpose computers used in controlling industrial processes. Under the direction of a stored control program, an industrial controller examines a series of inputs reflecting the status of the controlled process and changes a series of outputs controlling the process. The inputs and outputs may be binary, that is, on or off, or analog, providing a value within a substantially continuous range. The inputs may be obtained from sensors attached to the controlled process, and the outputs may be signals to actuators on the controlled process.

"Safety industrial control systems" are industrial control systems intended to ensure the safety of humans working in the environment of an industrial process. Such systems may include the electronics associated with emergency-stop buttons, light curtains, and other machine lockouts. Safety industrial control systems are not optimized for "availability", that is being able to function for long periods of time without error, but rather for "safety" which is being able to accurately detect error to shut down. Safety industrial controllers normally provide a predetermined safe state for their outputs upon a safety shutdown, the predetermined values of these outputs being intended to put the industrial process into its safest static mode.

Safety industrial control systems may be associated with a "safety integrity level" (SIL) indicating a given amount of risk reduction. Standard IEC EN 61508 defines four SIL levels of SIL-1 to SIL-4 with higher numbers representing higher amounts of risk reduction.

Industrial controllers that are part of a system providing SIL-2 and higher normally use diagnostic programs that run concurrently with the industrial controller to diagnose the operation of the hardware of the industrial controller to ensure that it is working correctly.

The process of developing diagnostic programs for industrial controllers has become increasingly difficult as more sophisticated processor architectures are adopted in the industrial controller industry. Advanced processor architectures include techniques such as out-of-order execution, speculative execution, cache snooping and the like which can greatly increase the speed of execution of the processor but which are extremely difficult to diagnose in real time.

Safety industrial control systems providing SIL-3 and higher preferably provide "full redundancy" in hardware, for example, using two different industrial controllers having separate microprocessors, memory systems, communication systems and the like. In such full redundancy systems, the industrial controllers execute in parallel and their results are compared. If these results do not match, a "safety fault" can be indicated, causing the control system to move to the safe state.

Full redundancy safety industrial control systems may also implement diversity in the hardware and software. Hardware diversity can be obtained, for example, using different microprocessor architectures. This hardware diversity helps to reduce the chance that a common mode failure of the microprocessors (for example, a design flaw) would occur providing matching erroneous outputs from the two microprocessors which would not be detected as a safety fault. Similarly, software diversity can be obtained by preparing two different control programs having the same functional specification using two different programming teams who each then produce programs with substantial variations in approach and logic.

Providing safety systems is relatively expensive and accordingly there is considerable interest in lowering the price point of such systems such as could increase their relative availability and thus overall safety of the community. One significant source of cost is the need for multiple microprocessors. Recent processor architectures used in industrial controllers have moved to "multicore" architectures in which multiple processing cores are contained inexpensively on a single integrated circuit die. These cores which share features such as an L2 cache, cache control circuitry and memory channels, however, are not sufficiently isolated for the purpose of "full redundancy" desirable to meet SIL-3 standards.

Preparing diverse software is also costly. While the approach of using separate development teams can be practical for commonly used programs having many users, many industrial control applications require custom written unique control programs where using this approach for single program cannot be cost justified.

SUMMARY OF THE INVENTION

The present invention provides a safety industrial controller that uses programs running on different cores on the same microprocessor to help detect safety faults. While this approach does not meet the full redundancy standards, the present inventor has recognized that the second core can effectively provide a real-time diagnostic for errors in the first core thus fulfilling a diagnostic rather than a redundancy function. The ability to create a diagnostic function in this way is particularly critical for the diagnosis of errors on sophisticated modern processors that would be difficult to detect using normal diagnostic programs.

The use of two cores, one of which provides a diagnostic feature, can provide a component of a "full redundancy" system, the latter including two processing platforms each having two cores where one core serves in a diagnostic capacity.

The present invention further provides a method of automatically generating diverse software without the need for separate development teams. The invention creates diverse software by modifying a given control program to execute on inverted data, thereby providing a mechanistic way of generating high diversity in the computer instructions expressing the desired control function without the need for human intervention.

Specifically, in one embodiment, the invention provides a safety industrial controller for an industrial system having sensors and actuators, and including a multicore processor having at least two cores and the computer memory. The computer memory holds: (a) an input data table holding data representing inputs from sensors; (b) an output data table holding data representing outputs to actuators; (c) a control program implementing a control logic for control of the industrial system reading the input data of the input table to provide output data for the output table; and (d) a safety operating system. The safety industrial controller further includes I/O interface circuitry adapted to attach to the sensors and actuators to transfer data from the sensors to the input data table and from the output data table to the actuators. The safety operating system dedicates a first core to execute a first version of the control program and dedicates a second core to execute a second version of the control program in parallel and to compare output data of the first and second versions of the control program to detect failure of the safety industrial controller.

It is thus a feature of at least one embodiment of the invention to make use of different cores of a multicore processor to implement diagnostic functions in the safety controller even though these cores are not sufficiently diverse for a full redundancy system.

The control program may execute cyclically to process all input data once per cycle and the safety operating system may provide a predetermined assignment of the first and second core to the first and second versions of the control program during all portions of the cycle.

It is thus a feature of at least one embodiment of the invention to provide a quasi-static assignment of the cores (in contrast to typical core usage) in enlisting the cores to provide dedicated diagnostic functions to a second companion core.

In some embodiments, the safety industrial controller may further include a second multicore processor having at least two cores and the second computer memory. The second computer memory may store: (a) a second input data table holding data representing inputs from the sensors; (b) a second output data table holding data representing outputs to the actuators; (c) a second control program implementing the control logic for control of the industrial system reading the second input data of the input table to provide output data for the second output table; and (d) a second safety operating system. The safety industrial controller may further include second I/O interface circuitry adapted to attach to the sensors and actuators to transfer data from the sensors to the input data table and from the output data table to the actuators, and the second safety operating system may dedicate a first core of the second multicore processor to execute a first version of the second control program and a second core of the second multicore processor to execute a second version of the second control program in parallel and to compare output data of the first and second versions of the second control program to detect failure of the safety industrial controller.

It is thus a feature of at least one embodiment of the invention to provide a subcomponent of a processor plus diagnostics that can be incorporated into a full redundancy system by duplication.

In one embodiment, the invention provides a method of operating a safety industrial controller for an industrial system having sensors and actuators, the safety industrial controller including multiple processors and a memory storing: an input data table holding data representing inputs from sensors, an output data table holding data representing outputs from actuators, and a control program implementing a control logic for the control of the industrial system reading the input data of the input table to provide output data for the output table. The safety industrial controller further includes I/O interface circuitry adapted to attach to the sensors and actuators to transfer data from the sensors to the input data table and from the output data table to the actuators. The invention prepares a diverse first and second version of a control program providing identical control of the industrial system through the use of different sequences of program instructions and loads the first and second diverse versions on a first and second separate processor. The first and second diverse versions on the first and second processors are then in parallel, and output data of the first and second versions of the control program are compared to detect failure of the safety industrial controller. The execution of the first and second diverse versions of the control program operate on first and second sets of input data in the input data table wherein the first set of input data is the logical inverse of the second set of data.

It is thus a feature of at least one embodiment of the invention to provide a mechanistic way of creating diverse software by modifying one program to operate on inverted data.

The operating system may also invert the output data from the second version of the control program prior to comparing the output data to the output data from the first version of the control program to indicate failure when this comparison indicates a difference.

It is thus a feature of at least one embodiment of the invention to provide an input and output inversion such as permits simple diversity generation through the use of DeMorgan's theorem.

The first version of the control program and second version of the control program may provide, respectively, first and second sets of sequentially executing statements wherein functionally identical portions of the first set of sequentially executing statements are not identical to functionally identical portions of the second set of sequentially executing statements.

It is thus a feature of at least one embodiment of the invention to provide different control programs that are unlikely to fail in the same way on a given hardware error.

These particular objects and advantages may apply to only some embodiments falling within the claims and thus do not define the scope of the invention.

DETAILED DESCRIPTION OF THE PREFERRED EMBODIMENT

Figure 1:
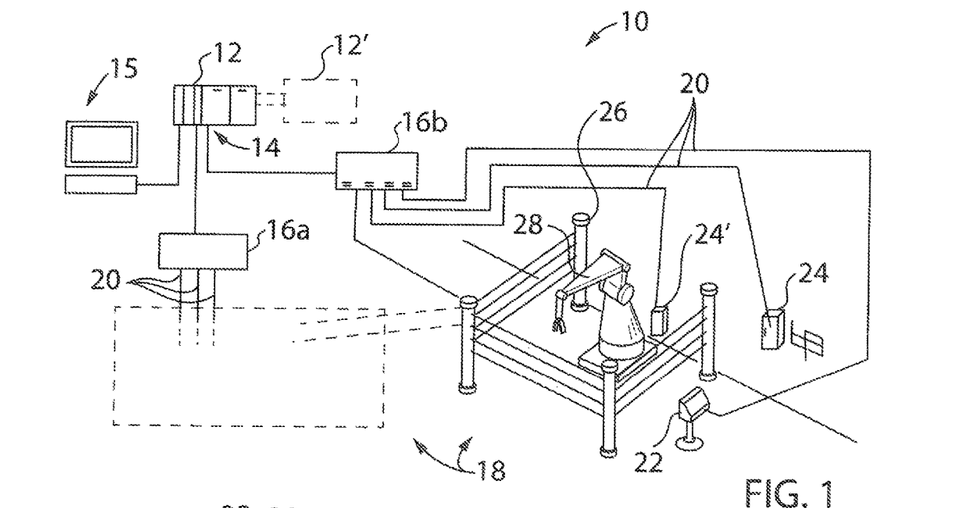
FIG. 1 is a block diagram of a safety industrial control system used, for example, in controlling access to a manufacturing cell.

Referring now to FIG. 1, a safety industrial control system 10 may provide for a safety controller 12 providing for one or more processors, associated power supplies, and communication modules, all hardened against the industrial environment as is generally understood in the art. The safety controller 12 may be used alone or may be teamed with a second safety controller to 12' to provide full hardware redundancy as will be discussed below.

Generally, the safety controller 12 provides multiple ports 14 communicating using high-speed serial links with a workstation 15 and being of conventional design providing an independent processor, memory, display screen, keyboard, and the like, as well as one or more remote I/O modules 16a and 16b.

The remote I/O modules 16 may include input and output circuits for receiving or outputting analog or digital signals directly between the I/O modules 16 and sensors and actuators of an industrial process 18 according to commands received from the safety controller 12. In this example, I/O module 16a may provide for multiple connections 20 with general (nonsafety) aspects of the industrial process to monitor and control that process, whereas I/O module 16b may provide for multiple connections 20' that communicate with safety portions of the industrial process 18, for example, including an emergency stop button 22, a remote lockout station 24 (together with an electrically controlled lockout switch 24') and access control such as a light curtain 26. The I/O module 16b may also communicate, for example, with a machine tool 28 (here a robotic manipulator) for the purpose of putting it in a safe state if necessary.

Figure 2:
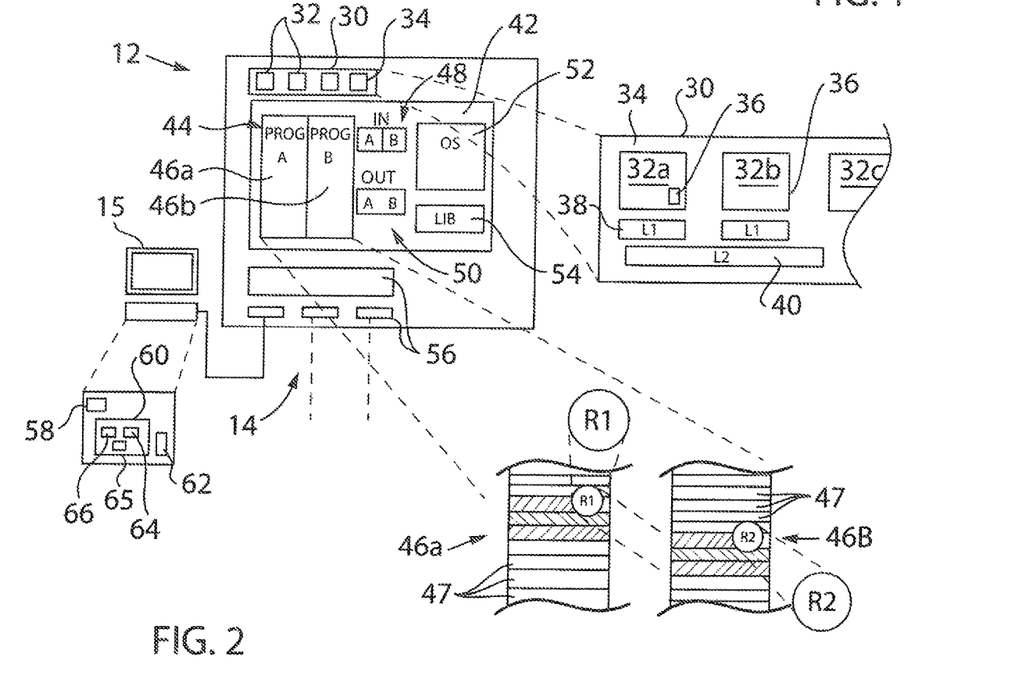
FIG. 2 is an architectural diagram of the industrial safety controller of FIG. 1 showing a multicore processor communicating with a memory holding an operating program and diverse control programs and input and output tables such as may communicate with a workstation.

Referring now to FIG. 2, the safety controller 12 may provide for a multicore processor 30 providing multiple processor cores 32 on a single integrated circuit die 34. Generally, each of the cores 32 may have an independent set of registers 36 and may be associated with a dedicated L1 cache 38. Nevertheless, the cores 32 may share an L2 cache 40 as well as cache control hardware and a memory controller and thus are not sufficiently diverse to support the implementation of a fully diverse industrial controller by using separate cores for the diversity. As is understood in the art, otherwise, the cores 32 provide for full microprocessor functionality including the execution of a set of arithmetic and logical instructions.

The cores of the multicore processor 30 may communicate with a common memory 42, for example, composed of random access memory including a mixture of volatile and nonvolatile memory types. Importantly, the memory 42 holds a control program set 44 implementing the logic necessary to control the industrial process 18 of FIG. 1. As will be discussed in more detail below, the control program set 44 will include two diverse but functionally identical programs 46a and 46b. Functional identity as used herein means that the programs 46a and 46b will provide identical control functionality of the industrial process 18. Diversity means that the programs employ different organizational structures reducing their propensity to respond in the same way to an isolated hardware failure.

In this regard, each of the programs 46a and 46b will be composed logically of a set of machine code statements 47 (for example, mapping to assembly language mnemonics) having an execution order. The selection and ordering of the machine code statements 47 in each of the programs 46a and 46b are such that less than 10 percent of the machine code statements 47 in a sequence of at least 10 statements in the programs 46a have matching counterparts in program 46b. More generally, a side-by-side comparison of the programs 46a and 46b shows little or no apparent matching between sequences of machine code statements 47. Generally, a machine code statements 47 is considered to include an operator and one or more memory or register references holding operands. Normally even sequences of operators are highly diverse, but where similar sequences of operators exist, the register references will typically be diverse.

The memory 42 may also include an input table 48 and an output table 50, respectively, with the input table 48 holding values received from sensors in the industrial process 18 and the output table 50 holding values to be output to actuators in the industrial process 18 (for example, including components of the machine tool 28). As with the control program set 44, each of the input table 48 and output table 50 are divided into two redundant components (labeled A and B) providing separate input or output values for the programs 46a and 46b as will be discussed below.

The memory 42 will also hold a safety operating system 52 which coordinates the execution of the program set 44 as will be discussed below. The memory 42 further holds a set of certified library routines 54 providing general functions used by a wide range of different types of application programs 46.

The operating system 52, executed by the multicore processor 30 operating in conjunction with additional dedicated circuitry 56 of the type generally understood in the art, implements I/O interface circuitry providing, for example, the ports 14 discussed above for communication with the workstation 15 and the remote I/O modules 16. In one embodiment, the I/O interface circuitry operates to regularly scan the sensors on the industrial process 18 to load the input table 48. The programs 46a and 46b are executed in one cycle on the data of the input table 48 to provide outputs stored in the output table 50. The I/O interface circuitry then reads the output table 50 sending this data to the necessary actuators of the industrial process 18. This process is then repeated. By enforcing separate scan and execution phases, the operating system 52 provides more deterministic execution of the programs.

Referring still to FIG. 2, the workstation 15 as is understood in the art will also include a processor 58 communicating with a memory 60 and interface circuitry 62 allowing it to communicate with the safety controller 12. Generally, the workstation 15 may be used to develop a control program 64 using software tools commercially available for the programming industrial controllers and may further operate on this control program 64 using a diversity generation program 66, as will be discussed below, to provide the programs 46a and 46b. The memory 60 may also hold a compiler 63.

Figures 3, 4:
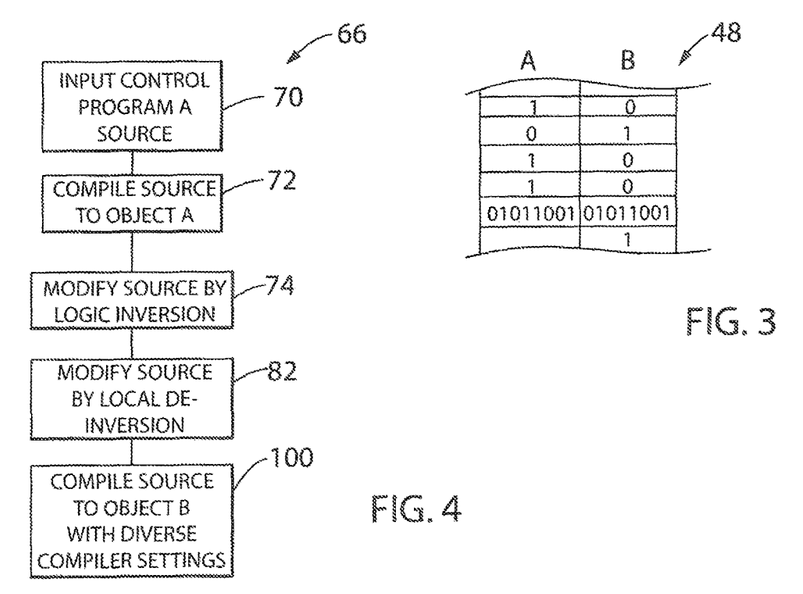
FIG. 3 is a fragmentary representation of the input table of FIG. 2 showing separate inverted and uninverted input data used with these diverse control programs.
FIG. 4 is a flowchart of a program executed on the workstation for preparing diverse control programs of FIG. 2 from a single control program.

Referring now to FIGS. 2 and 4, in this regard the control program 64 may be received by the diversity generation program 66 on the workstation 15 as indicated by process block 70. In the following discussion, the developed control program 64 will be designated "program A". At process block 72 the source code for program A may be compiled for the safety controller 12 as is generally understood in the art to provide program 46a, being generally an object code version of the control program 64 that can be loaded directly into the memory 42.

At succeeding process block 74, the diversity generation program 66 may further modify the source code of control program 64 (program A) by performing selected logical inversions on the program instructions.

Figure 5:
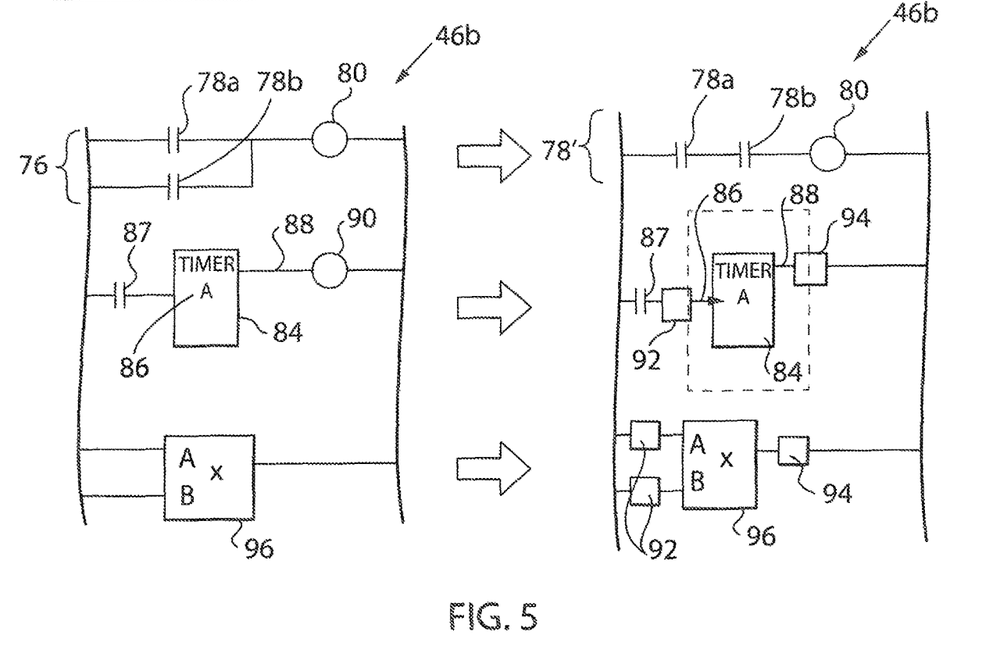
FIG. 5 is a representation of a control program showing example modifications of the control program used to create program diversity through logical inversion.

Referring now to FIG. 5, a basic logic inversion takes a logical primitive such as an OR-gate 76 and logically inverts that primitive. Here the OR-gate 76 is represented in well-known graphical ladder logic as two parallel "contacts" 78a and 78b (representing input data from input table 48) leading to "coil" 80 representing a single bit of output data in output table 50. In the logical inversion, this OR-gate 76 is converted to an AND-gate 76' represented as a series connection of contacts 78a and 78b communicating with output coil 80. A similar logical inversion of an AND-gate will be an OR-gate.

These two implementations of a primitive and its inversion will be functionally equivalent if the data received by an output from the primitive are also inverted. In the present example case of AND-gate 76', the input data associated with contacts 78a and 78b of AND-gate 76' are inverted with respect to the input data associated with contacts 78a and 78b of OR-gate 76, and the output data output from coil 80 of AND-gate 76' is again inverted. The net result of inverting the functional primitive and its input and output data is to provide an identical logical function according to De Morgan's law. This process can be generally extended to logic elements of AND, NOR and by extension NAND and NOR computer instructions. Thus, this logical inversion can occur with not only AND gates and OR gates but also NAND gates and NOR gates found in program 46a as well as any simple stateless combinations of such gates.

As noted, changing logical inversion as indicated in FIG. 5 must go hand-in-hand with an inversion of the input data and output data which will be performed during run time of the safety controller 12 as will be discussed below.

Referring again to FIG. 4, the modification of process block 74 may not be practical to more complex, "state-full" instructions, for example, timers and adders. The present inventors have recognized that diversity in these instructions, and in particular to the register assignments used for these instructions, is naturally promoted by the diversity of surrounding logical primitive instructions described above. In addition, the invention contemplates an additional diversity mechanism in the compiling process as will be discussed below with respect to process block 100. Accordingly, complex instructions like timers that accept Boolean values may be modified as indicated by process block 74 to be encapsulated within an inversion "bubble" allowing these instructions to work unmodified with the inverted input and output data now provided to the program 46b.

For example, referring again to FIG. 5, a timer 84 is shown having an "on" trigger 86 receiving a signal from a contact 87 (the latter representing a single bit in the input table 48) and an output 88 asserting at a predetermined time after assertion of the trigger 86 to provide an output to a coil 90 (the latter representing a single bit in the output table 50). In this case timer 84 may be adapted to work with program 46b by inverting the output signal received from contact 87 with newly introduced inverter 92 and inverting the output 88 of the timer 84 with matching newly introduced inverter 94 allowing the timer 84 to work with inverted data and with logical gates described above and must be freely integrated with those gates. Together the inverter 92 and inverter 94 bracket the timer 84 creating an inverted bubble around the timer. A similar approach may be used for more complex instructions to the extent that they have sets of discrete single bit input and outputs.

Referring still to FIG. 5, there will be certain instruction elements such as a multiplier 96 that will be difficult to modify with a logical inversion of the type described above because they receive "analog" values. In this case, these elements may be exempted from the logical inversion, for example, by preserving their data in an uninverted form in both the input table 48 and output table 50 or by using inverters 92 and 94 as discussed above. In the former case, the data may be easily segregated in the input table 48 and output table 50 according to the data type (multibit analog values). In this way, these more complex instructions such as multiplier 96 will execute identically in programs 46a and 46b, albeit because of the extensive modification of other instructions in those programs, these more complex instructions will normally use different register assignments and thus also be diverse.

Generally, elements such as timer 84 and multiplier 96 will call identical library routines 54 that are not diverse and for this reason these portions of the programs will not be diverse. The inventors have determined that this is acceptable because of the greater scrutiny given to these library routines 54 and the additional diversity implementation of process block 100; however, the invention also contemplates that specific diverse library routines 54 may be used in the programs 46a and 46b generated by conventional means.

Referring still to FIG. 4, a final degree of diversity may be added to all of the above elements through the use of another mechanism indicated by process block 100 of FIG. 4 which makes use of the compiler options of compiler 63 (shown in FIG. 2) to provide additional diversity in program 46b.

As is understood in the art, compilers include compiler option settings that change compiler optimizations without affecting the correctness of the compilation process. For example, different compiler optimization settings may optimize the speed of execution of the program or minimize the amount of memory used. When these optimizations are changed, the underlying machine code instructions 47 are substantially altered without changing logical function. As an example, consider a compiler optimization for speed that replaces a multiplication of a value by two with a left shifting of that value or by adding the value to itself. Left shifting or addition are faster than multiplication in most cases and accordingly this would be a speed optimization. Nevertheless, it will be appreciated that the instructions used for multiplication are diverse (different) from the instructions used for either left shifting or addition.

Accordingly, the compilation of the programs 46a and 46b will also use different optimizations settings of the same compiler. The invention contemplates that a wide variety of different optimizations may be different between the two compilations. Some optimizations relate to particular architectures which would not be relevant for the identical cores 32 but could also be used by simply artificially indicating that functionality is missing in one core causing a change in the compilation process. A nonlimiting list of compiler optimizations that may be varied include optimization for speed, optimization for compiled code size, constant folding, dead store elimination, loop unrolling, and the like.

Figure 6:
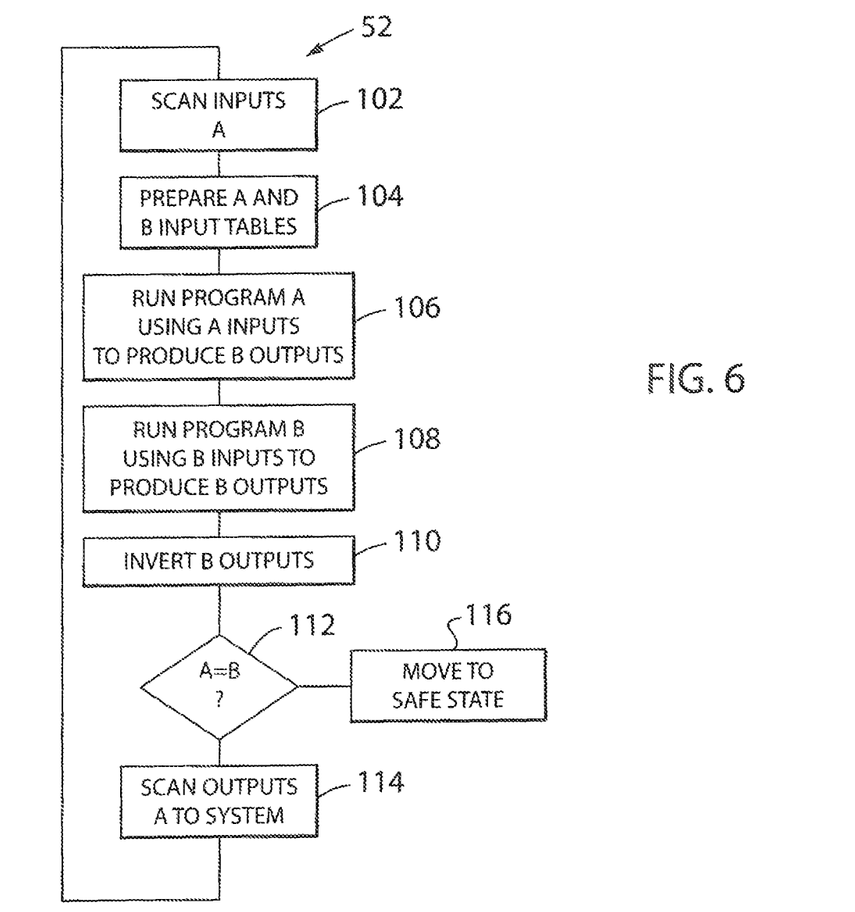
FIG. 6 is a flowchart of execution of the diverse control programs on the safety industrial controller for the detection of hardware errors.

Referring now to FIGS. 2 and 6, the programs 46a and 46b as generated above may be loaded into the memory 42 of the safety controller 12 and used to control the industrial process 18. At a first step in this execution, a scan of input values is conducted as indicated by process block 102. During the scan, the I/O circuitry reads inputs from the sensors of the industrial process 18 and loads them to the input table 48 for processor A.

As indicated by process block 104, at the conclusion of the scan, the inputs of A are then propagated to the B side of input table 48 by inverting those values which represent Boolean states, for example, such as will provide inputs to contacts in the program shown in FIG. 5. Values which represent analog values are also inverted but will be "un-inverted" before being used as will be discussed below.

Referring momentarily to FIG. 3, "digital" or binary values from the scanning (for example, received from two-state devices such as limit switches) having a "true" or "one" value in side A will be inverted and written to side B as values of "false" or "zero". Similarly, binary values from the scanning that have a "false" or "zero" value in side A will be inverted and written to side B as values of "true" or "one". Values that are not binary (to the extent that they are not limited to one of two values), also termed "analog" values, will be transferred from side A to side B without modification. These are values of the type handled by the multiplier 96 of FIG. 5.

Referring again to FIG. 6, at process blocks 106 the operating system 52 executes the program 46a using a first core 32 and operating on the data of the input table 48 from side A to produce data in the output table 50 written to side A. Similarly, at process block 108, program 46b (compiled to be diverse as discussed above) is executed by a second core 32 using the data of the input table 48 from side B to produce data in the output table 50 written to side B.

At process block 110, the digital data of side B of the output table 50 is then inverted and as inverted is compared to the data of output table 50 at side A per decision block 112. It should be understood that this description is intended to be functional and does not necessarily require inverting of the data of side B of the output table 50 for comparison. Alternatively, the data of side B of output table 50 may be compared to the data of side A of the data table 50 using an exclusive or (XOR) which will generate values of zero if there is a match.

In all cases, this data matches, suggesting that the hardware associated with two different cores 32 are functioning correctly, the program proceeds to process block 114 and the data of output table 50 at side A is output by the I/O circuitry to the actuators of the safety controller 12. The steps of process blocks 102-114 are then repeated indefinitely during execution of the control process.

If at decision block 112, an error is indicated (in a failure of the data to match), the safety controller 12 moves to a safe state indicated by process block 116 where the output values revert to predetermined safe output values, for example, values of zero or according to a safe state file (not shown).

Figure 7:
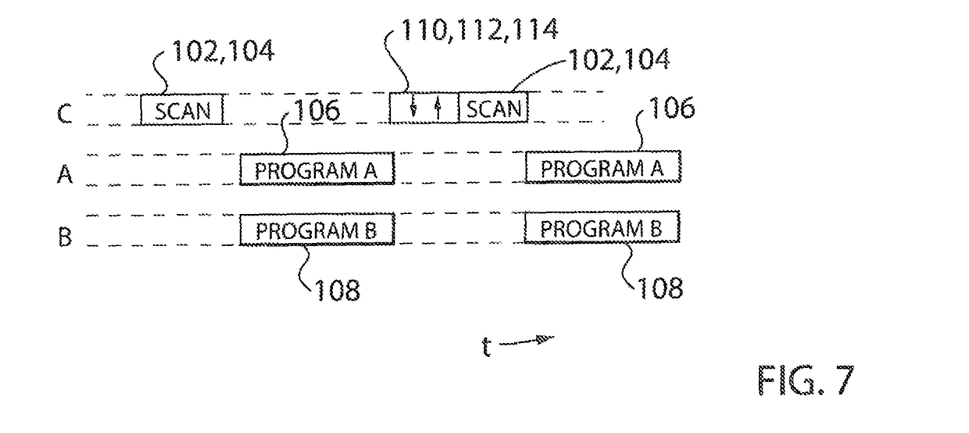
FIG. 7 is a scheduling diagram showing a first embodiment in which the diverse programs are executed in parallel.

Referring now to FIG. 7, unlike normal operation of a multicore processor, the given core executing a given program 46a or 46b will normally not be reassigned during that execution of that program 46a or 46b, for example, as would occur during execution by a normal operating system of a type providing rapid context switching between processors. Thus, in one embodiment, program 46a may be statically assigned to a first core A (for example, core 32a), and program 46b may be statically assigned to a second core B (for example, core 32b) during the execution of the programs 46a and 46b. Optionally, the scanning and preparation of the input table values per process blocks 102 and 104 might be executed by a third core denoted C. In this approach, after the scan executed by the core C, the execution of program 46a per process block 106 might be executed exclusively by a core designated A whereas the execution of the program 46b per process block 108 might be executed by a core designated B. The comparison steps of process blocks 110, 112 and the scanning output of process block 112 may again be implemented by the core designated C. This static assignment of cores allows the programs 46A and 46b to more accurately identify hardware error associated with the course. This operation may be used to implement SIL-2 safety but generally not SIL-3 safety which preferably uses full hardware redundancy. Diagnostics of shared components between the cores of the safety controller may be implemented by other mechanisms, for example, periodically run test routines.

Figure 8:
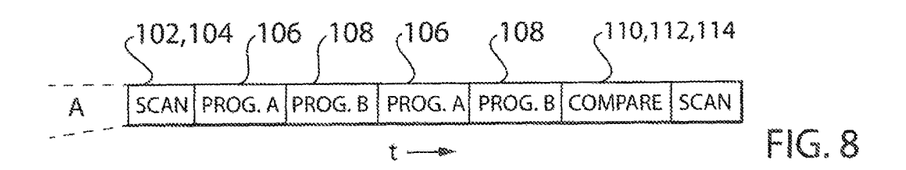
FIG. 8 is a figure similar to FIG. 7 showing an alternative embodiment in which the diverse programs are executed by as few as a single processor.

Referring now to FIG. 8, it will be appreciated, that the diversity generating program of the present invention may also be used to identify hardware errors where only a single core or processor is available. In this case, the above steps may all be interleaved on the same core or processor, here designated processor A. Thus, for example, the steps of scanning and preparation of the input table values per process blocks 102 and 104 might be executed by processor A followed by alternating executions of a full or partial execution of one cycle of the program 46a per process block 106 and one cycle of the program 46b per process block 108. The same core A may then execute the steps of process blocks 110, 112 and the scanning output of process block 112. The diversity of the programs 46a and 46b may continue to reveal certain types of hardware failures if the outputs generated by these successive executions of the programs 46a and 46b do not match during the comparison process. Again, this operation may be used to implement SIL-2 safety by providing robust diagnostics of core failure but generally is not preferred for SIL-3 safety which desirably uses full hardware redundancy.

Figure 9:
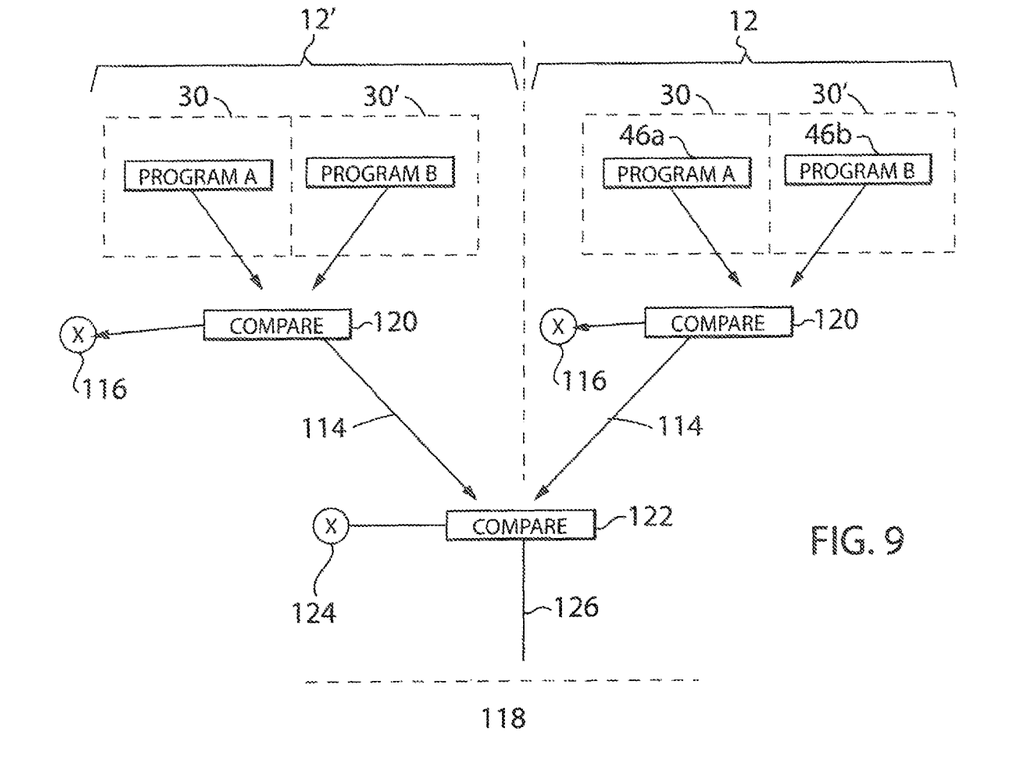
FIG. 9 is a process flow chart showing use of the present invention to provide full redundancy.

Referring to FIG. 9, as noted above, the execution of programs 46a and 46b separately on different cores 32 provides for the ability to diagnose some types of hardware failures, overcoming the difficulty of diagnosing failure in some sophisticated architectural features such as out-of-order prosecution or speculation. Accordingly, this technique can provide additional value even when used with full hardware redundancy in which two fully redundant processor systems, for example, in safety controller 12 and safety controller 12', are employed. Under this system, within each safety controller 12 and 12', different cores 32a and 32b (for example) may execute identical or different programs 46a and 46b as discussed above and a comparison of the outputs made as indicated by comparison block 120 (representing generally the operations of steps 110, 112, of program FIG. 6). This process may be executed internally by the operating system of each of the safety controllers 12 and 12' separately. Failure of this comparison may lead to the entry of the safe state 116 indicating a hardware failure of a type identified by hardware diagnostics, and this failure is communicated to the other of the safety controllers to evoke a similar response.

If the comparison of comparison blocks 120 is successful (meaning that the two programs show the same outputs at comparison block 112 of FIG. 6) outputs A of the safety controllers 12 and 12' may then be compared by a comparison mechanism 122, for example, dedicated hardware or processors in one safety controller 12 to provide an evaluation under full redundancy of the proper operation of the safety controllers 12 and 12'. Again, if this comparison at process block 122 indicates a discrepancy between the values from the safety controllers 12 and 12', then the controllers revert to a safe state failure mode 124 providing predetermined safe state outputs. Otherwise an output 126 is used for the control of the industrial process 118 based on the output values of one of the safety controllers 12. This process provides a more comprehensive understanding of the hardware of each of the safety controllers 12 while also providing detailed diagnostics of their processors. This operation may be advantageously used to implement SIL-3 safety.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A safety industrial controller for an industrial system having sensors and actuators, the safety industrial controller comprising:
    a multicore processor having at least two cores;
    a computer memory storing:
    (a) an input data storage holding data representing inputs from sensors;
    (b) an output data storage holding data representing outputs to actuators;
    (c) a control program implementing a control logic for control of the industrial system reading the input data of the input table to provide output data for the output table; and
    (d) a safety operating system; and
    I/O interface circuitry adapted to attach to the sensors and actuators to transfer data from the sensors to the input data storage and from the output data storage to the actuators; wherein:
    the safety operating system dedicates a first core to execute a first version of the control program and a second core to execute a second version of the control program in parallel,
    the first version of the control program includes a first set of sequentially executing machine code instructions and the second version of the control program includes a second set of sequentially executing machine code instructions,
    both the first and second sets of sequentially executing machine code instructions include operators and operands,
    the first set of sequentially executing machine code instructions generates a first set of output data,
    the second set of sequentially executing machine code instructions generates a second set of output data,
    at least one of the operators and the operands in the first set of sequentially executing machine code instructions are arranged in a different sequence or consist of different operators and operands than the second set of sequentially executing machine code instructions,
    the first set of output data is identical to the second set of output data, and
    the safety operating system is configured to compare the first set of output data to the second set of output data to detect failure of the safety industrial controller.

2. The safety industrial controller of claim 1 wherein the at least two cores share a common cache.

3. The safety industrial controller of claim 1 wherein the at least two cores are on a single integrated circuit die.

4. The safety industrial controller of claim 1 wherein the multicore processor includes at least three cores and the safety operating system is executed on a third core.

5. The safety industrial controller of claim 1 wherein the control program executes cyclically to process all input data once per cycle and wherein the safety operating system provides a predetermined assignment of the first and second core to the first and second versions of the control program during all portions of the cycle.

6. The safety industrial controller of claim 1 further including:
    a second multicore processor having at least two cores;
    a second computer memory storing:
    (a) a second input data storage holding data representing inputs from the sensors;
    (b) a second output data storage holding data representing outputs to the actuators;
    (c) a second control program implementing the control logic for control of the industrial system reading the second input data of the input table to provide output data for the second output table; and
    (d) a second safety operating system; and
    a second I/O interface circuitry adapted to attach to the sensors and actuators to transfer data from the sensors to the input data storage and from the output data storage to the actuators;
    wherein the second safety operating system dedicates a first core of the second multicore processor to execute a first version of the second control program and a second core of the second multicore processor executes a second version of the second control program in parallel to compare output data of the first and second versions of the second control program to detect failure of the safety industrial controller.

7. The safety industrial controller of claim 1 wherein the safety operating system upon detection of a failure of the safety industrial controller, provides signals through the I/O interface to move the actuators to a predetermined safe state.

8. The safety industrial controller of claim 1 wherein the first version and second version of the control program operate on first and second sets of input data in the input data storage wherein the first set of input data is a logical inverse of the second set of data.

9. The safety industrial controller of claim 8 wherein the operating system indicates failure if the output data from the second version of the control program is not inverted with respect to the output data from the first version of the control program.

10. The safety industrial controller of claim 1 wherein portions of the first set of sequentially executing machine code instructions provide for different register assignments than functionally identical portions of the second set of sequentially executing machine code instructions.

11. The safety industrial controller of claim 1 wherein the first and second sets of sequentially executing machine code instructions expressed as assembly language statements have fewer than ten percent of their instructions in matching assembly language instructions exceeding ten instructions in length.

12. The safety industrial controller of claim 1 wherein the computer memory further includes library routines called by the control program and wherein the first version of the control program and second version of the control program call the same library routines.

13. A method of operating a safety industrial controller for an industrial system having sensors and actuators, the safety industrial controller including:
  multiple processors,
  a memory storing: an input data storage holding data representing inputs from sensors, an output data storage holding data representing outputs from actuators, a control program implementing a control logic for the control of the industrial system reading the input data of the input table to provide output data for the output table, a safety operating system; and
  I/O interface circuitry adapted to attach to the sensors and actuators to transfer data from the sensors to the input data storage and from the output data storage to the actuators;
  the method comprising the steps of:
  (a) preparing a diverse first and second version of a control program providing identical control of the industrial system through a use of different sequences of program instructions, wherein:
    the first, version of the control program includes a first set of sequentially executing machine code instructions,
    the second version of the control program includes a second set of sequentially executing machine code instructions,
    the first and second sets of sequentially executing machine code instructions include operators and operands, and
    at least one of the operators and the operands in the first set of sequentially executing machine code instructions are arranged in a different sequence or consist of different operators and operands than the second set of sequentially executing machine code instructions;
  (b) loading the first and second diverse versions on a first and second separate processor;
  (c) executing the first and second diverse versions on the first and second processors in parallel, wherein the first set of sequentially executing machine code instructions generates a first set of output data, the second set of sequentially executing machine code instructions generates a second set of output data, and the first set of output data is identical to the second set of output data; and
  (d) comparing the first set of output data to the second set of output data to detect failure of the safety industrial controller.

14. The method of claim 13 wherein the processor includes at least three cores and including the step of executing the operating system on a third core.

15. The method of claim 13 including the step of cyclically executing the control program to process all input data once per cycle and providing a predetermined assignment of the first and second core to the first and second versions of the control program during all portions of the cycle.

16. The method of claim 13 wherein the operating system inverts the output data from the second version of the control program prior to comparing the output data to the output data from the first version of the control program to indicate failure when this comparison indicates a difference.

17. The method of claim 13 wherein execution of the first and second diverse versions of the control program operate on first and second sets of input data in the input data storage wherein the first set of input data is a logical inverse of the second set of data.

18. The method of claim 17 wherein the safety industrial controller further includes a second memory storing: an input data storage holding data representing inputs from sensors, an output data storage holding data representing outputs from actuators, a control program implementing a control logic for the control of the industrial system reading the input data of the input table to provide output data for the output table; and further including the steps of:
  (a) preparing a diverse third and fourth version of the control program providing identical control of the industrial system through the use of different sequences of program instructions;
  (b) loading the third and fourth diverse versions on a third and fourth separate processor; and
  (c) executing the third and fourth diverse versions on the third and fourth processors in parallel and comparing output data of the third and fourth versions of the control program to detect failure of the safety industrial controller;
  wherein the execution of the third and fourth diverse versions of the control program operates on third and fourth sets of input data in the input data table of the second memory and wherein the first set of input data is the logical inverse of the second set of data of the second memory;
  wherein the second safety operating system dedicates a first core of the second multicore processor to execute a first version of the second control program and a second core of the second multicore processor executes a second version of the second control program in parallel to compare output data of the first and second versions of the second control program to detect failure of the safety industrial controller.

\* \* \* \* \*